(12) United States Patent
Behrangrad

(10) Patent No.: US 9,625,930 B2
(45) Date of Patent: Apr. 18, 2017

(54) DEMAND RESPONSE METHOD AND DEMAND RESPONSE CONTROL APPARATUS

(71) Applicant: Panasonic Corporation, Osaka (JP)

(72) Inventor: Mahdi Behrangrad, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 360 days.

(21) Appl. No.: 14/358,826

(22) PCT Filed: Sep. 4, 2013

(86) PCT No.: PCT/JP2013/005242
§ 371 (c)(1),
(2) Date: May 16, 2014

(87) PCT Pub. No.: WO2014/038201
PCT Pub. Date: Mar. 13, 2014

(65) Prior Publication Data
US 2015/0088315 A1    Mar. 26, 2015

(30) Foreign Application Priority Data
Sep. 6, 2012   (JP) ................... 2012-196186

(51) Int. Cl.
G05F 1/66      (2006.01)
H02J 13/00     (2006.01)
(Continued)

(52) U.S. Cl.
CPC ............ *G05F 1/66* (2013.01); *G05B 15/02* (2013.01); *G06Q 10/06* (2013.01);
(Continued)

(58) Field of Classification Search
None
See application file for complete search history.

(56) References Cited

U.S. PATENT DOCUMENTS

2010/0241285 A1    9/2010   Johnson et al.
2010/0314942 A1   12/2010   Talkin et al.
(Continued)

FOREIGN PATENT DOCUMENTS

EP    2 296 246 A2    3/2011
JP    2003-284244    10/2003
(Continued)

OTHER PUBLICATIONS

Extended European Search Report issued Jul. 6, 2015 in corresponding European Application No. 13835296.8.
(Continued)

*Primary Examiner* — Tuan Dao
(74) *Attorney, Agent, or Firm* — Wenderoth, Lind & Ponack, L.L.P.

(57) ABSTRACT

A demand response method includes: obtaining DR contracts scheduled to be implemented in a target period; determining, for each of the DR contracts, whether or not content of the adjustment of the supply and demand for electrical energy requested in the DR contract is executable; generating one or more DR scenarios each being a combination of two or more of the DR contracts executable in the target period; and extracting, from among the generated one or more DR scenarios, at least one DR scenario of which a total value of an amount of the adjustment of the supply and demand for electrical energy of the at least one appliance satisfies contract conditions of each of the two or more of the DR contracts included in the at least one DR scenario when the at least one appliance is caused to operate based on the at least one DR scenario.

5 Claims, 10 Drawing Sheets

(51) Int. Cl.
  *G06Q 10/06* (2012.01)
  *G05B 15/02* (2006.01)
  *H02J 3/00* (2006.01)

(52) U.S. Cl.
  CPC ........... *H02J 13/0006* (2013.01); *H02J 3/008* (2013.01); *Y02B 70/3216* (2013.01); *Y04S 20/221* (2013.01); *Y04S 50/10* (2013.01)

(56) References Cited

U.S. PATENT DOCUMENTS

| | | |
|---|---|---|
| 2011/0046805 A1 | 2/2011 | Bedros et al. |
| 2011/0066300 A1 | 3/2011 | Tyagi et al. |
| 2011/0218680 A1 | 9/2011 | Kim et al. |
| 2011/0231320 A1 | 9/2011 | Irving |
| 2011/0251731 A1 | 10/2011 | Yang et al. |
| 2012/0078593 A1 | 3/2012 | Kubota et al. |
| 2012/0296799 A1* | 11/2012 | Playfair ................. G06Q 10/00 705/37 |
| 2012/0323385 A1* | 12/2012 | Thiruvengada ....... G06F 1/3203 700/291 |
| 2013/0346768 A1* | 12/2013 | Forbes, Jr. ............. G06F 1/266 713/310 |

FOREIGN PATENT DOCUMENTS

| | | |
|---|---|---|
| JP | 2011-62075 | 3/2011 |
| JP | 2012-65468 | 3/2012 |

OTHER PUBLICATIONS

International Search Report issued Oct. 15, 2013 in corresponding International Application No. PCT/JP2013/005242.
Communication pursuant to Article 94(3) EPC issued Jun. 14, 2016 in corresponding European patent application No. 13835296.8.

* cited by examiner

DEMAND RESPONSE METHOD AND DEMAND RESPONSE CONTROL APPARATUS

TECHNICAL FIELD

The present invention relates to a demand response method and the like for adjusting supply and demand for electrical energy in an electrical energy system.

BACKGROUND ART

In recent years, due to tight condition of supply and demand for electrical energy and liberalization of the energy market, a demand response (hereinafter also referred to as "DR") system has been receiving attention. In this DR system, there is a DR aggregator who provides a DR service to a customer. Based on a contract between the DR aggregator and the customer (hereinafter also referred to as "DR provider"), the DR aggregator requests the customer to adjust supply and demand for electrical energy in a predetermined period (time step), thereby adjusting the supply and demand for electrical energy in an electrical energy system (see Patent Literature (PTL) 1, for example).

The DR provider controls a resource (an appliance which performs at least one of consuming electrical energy, accumulating electrical energy, and generating electrical energy) of the DR provider, according to a contractual coverage of the DR service. This allows the DR aggregator to stabilize the electrical energy system, and the DR provider can receive an incentive from a DR purchaser. On the other hand, the DR provider may face a penalty such as paying penalty charges to the DR aggregator when the DR provider fails to control the resource according to the DR service.

CITATION LIST

Patent Literature

[PTL 1] Japanese Unexamined Patent Application Publication No. 2003-284244

SUMMARY OF INVENTION

Technical Problem

As a DR aggregation expands along with the expansion of a smart grid, it can be considered that a DR provider selects and implements multiple DR services in one time step.

However, there still remains a room to study for a method of properly implementing multiple DR services in one time step.

In view of the above, the present invention provides a demand response method which allows properly implementing multiple DR services in one time step.

Solution to Problem

A demand response (DR) method according to an aspect of the present invention is a demand response method for controlling at least one appliance, based on a DR contract that is a contract for adjusting supply and demand for electrical energy in an electrical energy system, the method including: obtaining information items related to a plurality of the DR contracts scheduled to be implemented in a target period; determining, for each of the DR contracts, whether or not the adjustment of the supply and demand for electrical energy requested in the DR contract is executable using the at least one appliance; generating, based on a result of the determining, one or more DR scenarios each of which is a combination of the DR contracts executable using the at least one appliance in the target period; extracting, from the generated one or more DR scenarios, at least one DR scenario of which an amount of the adjustment of the supply and demand for electrical energy satisfies contract conditions of each of the DR contracts included in the at least one DR scenario when the at least one appliance is controlled based on the at least one DR scenario; and performing adjustment of the supply and demand for electrical energy by controlling the at least one appliance in the target period, the adjustment corresponding to the DR contracts included in one of the extracted at least one DR scenario.

It is to be noted that these generic and specific aspects may be implemented using a system, a method, an integrated circuit, a computer program, or a non-transitory computer-readable recording medium such as a compact disc read only memory (CD-ROM), and may also be implemented by any combination of systems, methods, integrated circuits, computer programs, and recording media.

Advantageous Effects of Invention

According to the present invention, it is possible to properly implement multiple DR services in one time step.

Figure 1:
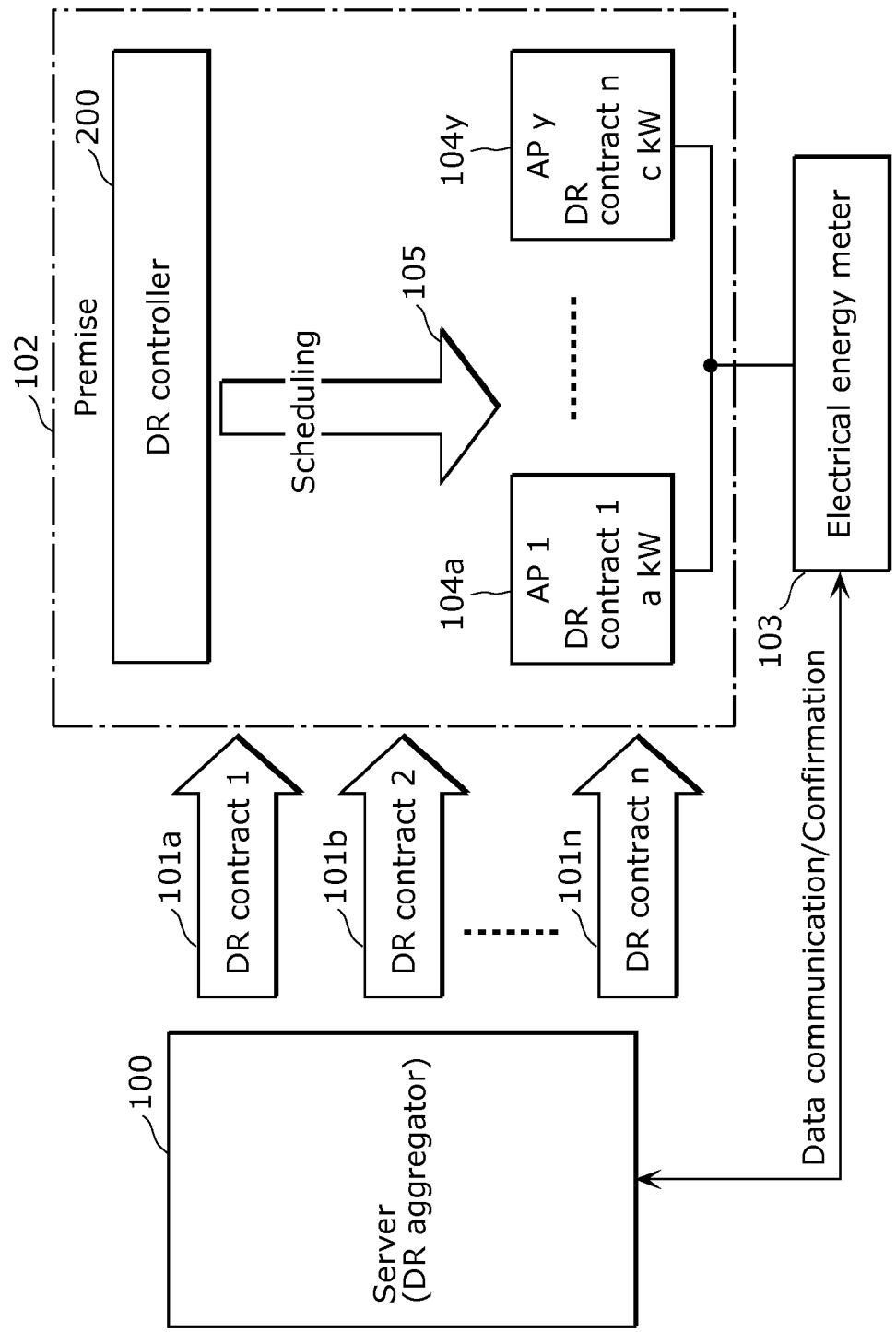
FIG. 1 is a diagram illustrating a system configuration of a DR system according to an exemplary embodiment.

DESCRIPTION OF EMBODIMENTS (Underlying Knowledge Forming Basis of the Present Disclosure)

As described above, along with liberalization of electrical energy in recent years, a DR service has been proposed with the aim of stabilization of electrical energy system. According to the DR service, a DR provider changes a consumption pattern of electrical energy of a resource, according to a contractual coverage of the DR service. There are a variety of types (contractual coverage) of DR services. To be specific, typical DR services include, for example: "peak cut" for reducing electrical energy (amount of electrical energy) of a predetermined value in a time step, "frequency regulation" which allows charging or discharging based on an order value for adjusting frequency of an electrical energy system, "reserve supply" (spinning reserve, non-spinning reserve, replacement reserve) for supplying reserve to an electrical energy system, and so on. The DR services also include "interruptible load", "voltage regulation", "emergency resources", "capacity resources", and so on.

The utilization of the DR services allows reduction in: system operation costs; green house gas (GHG) emission; required capital investment for network expansion; and black outs. With the expansion of DR service utilization, improvement in reliability and security in the system, and higher efficiency in electrical energy (electrical energy market) can be expected.

In addition, the DR provider can receive an incentive by performing the DR service, as described above. Therefore, when more DR services are provided by the DR provider, it will bring benefits to both the DR aggregator and the DR provider.

Conventionally, however, when a resource is used which is placed in one premise (here, "one premise" refers to a premise having one connecting point to the electrical energy system), just one type of DR service can be provided in each time step.

The reason for this is that various troubles are likely to occur when multiple types of DR services are simply allocated to a resource of the DR provider. For example, there may be the case where a DR service having a contract of reducing a predetermined value of electrical energy (peak cut) and a DR service having a contract of charging and discharging for the electrical energy system according to an order value (FR regulation) are both implemented in a given time step. In such a case, when the predetermined value of electrical energy is not reduced as a result of performing the FR regulation, the DR provider breaches the contract of the peak cut and faces a penalty such as paying penalty charges.

On the other hand, expansion of the smart grids, expansion of the DR aggregation businesses, and popularization of smart appliances are noticeable in recent years. In addition, manufacturing costs for high-performance DR controllers are reduced in recent years, leading to rapid expansion of the DR controllers.

Under the circumstances as described above, users have more and more opportunities for participating in DR service provision as DR providers, and there is a great need for providing multiple types of DR services (hereinafter also referred to as DR contracts) in each time step by the DR provider. In addition, realization of providing multiple types of DR services in each time step allows the DR aggregator to further stabilize the electrical energy system.

In view of the above, the exemplary embodiment provides a demand response method and a demand response control apparatus for properly assigning each resource (appliance) of a DR provider to multiple DR services such that contract conditions of a DR contract are satisfied.

A demand response method according to an aspect of the present invention is a demand response method for causing at least one appliance to operate, based on a DR contract that is a contract for adjusting supply and demand for electrical energy in an electrical energy system, the method including: obtaining a plurality of the DR contracts scheduled to be implemented in a target period; determining, for each of the obtained DR contracts, whether or not content of the adjustment of the supply and demand for electrical energy requested in the DR contract is executable using the at least one appliance; generating, based on a result of the determining, one or more DR scenarios each of which is a combination of two or more of the DR contracts executable using the at least one appliance in the target period; extracting, as an optimization scenario, from among the generated one or more DR scenarios, at least one DR scenario of which a total value of an amount of the adjustment of the supply and demand for electrical energy of the at least one appliance satisfies contract conditions of each of the two or more of the DR contracts included in the at least one DR scenario when the at least one appliance is caused to operate based on the at least one DR scenario; and selecting one of the extracted one or more optimization scenarios, and, based on the two or more of the DR contracts included in the selected optimization scenario, causing the at least one appliance to operate in the target period.

In addition, for example, the at least one appliance may include an air-conditioning device, and in the selecting, from among the extracted one or more optimization scenarios, an optimization scenario may be selected of which a time period for adjusting supply and demand for electrical energy by shutting down the air-conditioning device is shorter than a predetermined time period.

In addition, for example, in the selecting, from among the extracted one or more optimization scenarios, an optimization scenario may be selected of which an incentive to be obtained is greater than or equal to a predetermined value.

In addition, for example, the total value of the amount of the adjustment of the supply and demand for electrical energy of each of the at least one appliance may be monitored by an electrical energy meter.

In addition, for example, the content of the adjustment of the supply and demand for electrical energy requested in the DR contract may include at least one of peak cut, frequency regulation, and reserve supply.

In addition, a demand response (DR) control apparatus according to an aspect of the present invention is a demand response control apparatus which causes at least one appliance to operate, based on a DR contract that is a contract for adjusting supply and demand for electrical energy in an electrical energy system, the apparatus including: an obtaining unit configured to obtain a plurality of the DR contracts scheduled to be implemented in a target period; a determining unit configured to determine, for each of the obtained DR contracts, whether or not content of the adjustment of the supply and demand for electrical energy requested in the DR contract is executable using the at least one appliance; a generating unit configured to generate, based on a result of the determining performed by the determining unit, one or more DR scenarios each of which is a combination of two or more of the DR contracts executable using the at least one appliance in the target period; and an extracting unit configured to extract, as an optimization scenario, from among the generated one or more DR scenarios, at least one DR scenario of which a total value of an amount of the adjustment of the supply and demand for electrical energy of the at least one appliance satisfies contract conditions of each of the two or more of the DR contracts included in the at least one DR scenario when the at least one appliance is caused to operate based on the at least one DR scenario.

In addition, for example, the DR control apparatus may further include selecting unit configured to select one of the extracted one or more optimization scenarios, and, based on the two or more of the DR contracts included in the selected optimization scenario, cause the at least one appliance to operate in the target period.

In addition, for example, the total value of the amount of the adjustment of the supply and demand for electrical energy of each of the at least one appliance may be monitored by an electrical energy meter.

It is to be noted that these generic and specific aspects may be implemented using a system, a method, an integrated circuit, a computer program, or a non-transitory computer-readable recording medium such as a compact disc read only memory (CD-ROM), and may also be implemented by any combination of systems, methods, integrated circuits, computer programs, and recording media.

It is to be noted that the exemplary embodiment described below shows a general or specific example. The numerical values, shapes, materials, structural elements, the arrangement and connection of the structural elements etc. shown in the following embodiment are mere examples, and therefore do not limit the present invention. In addition, among the structural elements in the following embodiments, structural elements not recited in any one of the independent claims are described as arbitrary structural elements.

(Embodiment)

In this exemplary embodiment, an example of applying the demand response control apparatus according to the present invention to a DR controller provided in a premise managed by a DR provider will be described.

First, a system configuration of the DR system according to the exemplary embodiment will be described. FIG. 1 is a diagram illustrating a system configuration of the DR system according to the exemplary embodiment.

It is to be noted that an appliance is deemed as separate "control blocks" according to the state in this embodiment. For example, in the case of an air conditioner capable of switching the rated power among 75%, 50%, 25% and 0% to be allocated to a DR operation, this air conditioner is treated as four control blocks capable of performing the DR operation. More specifically, even though it is a single air conditioner, the state where 75% of the rated power can be used for the DR operation and the state where 50% of the rated power can be used for the DR operation are distinguished and treated as different control blocks.

According to the exemplary embodiment, it is possible to allocate each of the control blocks to a different one of the DR contracts (DR services). It is to be noted that there may be the description of "allocate a control block to a DR contract" below, it means the same as above.

In addition, the notation of "(DRx, APyz)" in this embodiment indicates that "control block z of electrical equipment y" is allocated to "DR contract x". Also in this embodiment, the notation of "(DRx, APyz) combination" means at least two (DRx, APyz) pairs that are scheduled to perform the DR operation at the same time. In addition, in this embodiment, a DR scenario is an operational plan for each appliance in the same time step, assigning a control block of each appliance to a DR contract implemented in the time step.

As illustrated in FIG. 1, a server 100 presents various types of DR contracts (DR contracts 101a to 101n) to a DR provider. The server 100 is managed by a DR aggregator. The DR provider is a general customer (user).

It is to be noted that, although FIG. 1 illustrates the case where the user contracts multiple DR services with a single DR aggregator, the DR system according to the exemplary embodiment is not limited to such an aspect. For example, the user may contract multiple DR services with different DR aggregators. In this case, a DR controller 200 may be connected to a plurality of servers managed by the respective DR aggregators.

Appliances 104a to 104y and the DR controller 200 which causes these appliances to perform operation (DR operation) based on the DR contracts are provided in a premise 102 (home) of the DR provider. A total electrical energy in the electrical energy system consumed by these appliances or a total electrical energy supplied to the electrical energy system by these appliances is monitored by an electrical energy meter 103.

According to the exemplary embodiment, each of the appliances 104a to 104y performs at least one of (i) consuming electrical energy, (ii) accumulating electrical energy, and (iii) generating and/or supplying electrical energy. For example, an appliance which consumes electrical energy includes a home appliance such as an air conditioner. An appliance which accumulates electrical energy includes a secondary battery (including an electric vehicle). An appliance which generates and/or supplies electrical energy includes the secondary battery or a solar power system.

The appliances 104a to 104y include appliances used for different types of DR services according to the exemplary embodiment, and in this case, a plurality of DR controllers 200 each associated with a different one of types of DR services may be provided.

For example, the appliance which performs the DR service of peak cut may be controlled by a first DR controller, and the appliance which performs the DR service of FR regulation may be controlled by a second DR controller different from the first DR controller.

The electrical energy meter 103 is placed in the premise 102 by the DR aggregator. Accordingly, the DR aggregator obtains data of use situation of electrical energy in a home which is transmitted from the electrical energy meter 103, and determines whether or not a contract condition of the DR contract is satisfied. The electrical energy meter 103 is, in other words, a connecting point between the electrical energy system and the premise 102, and an amount of inputs and outputs of electrical energy (the amount of adjustment of supply and demand for electrical energy) measured by the electrical energy meter 103 is a criteria for determining whether or not the contract condition of the DR contract is satisfied. In sum, the amount of adjustment of supply and demand for electrical energy by the appliances 104a to 104y is monitored by the electrical energy meter 103.

The DR controller 200 is an apparatus for performing scheduling 105 in consideration of processing capacity of the appliances 104a to 104y and the contractual coverage of the DR contracts 101a to 101n.

In the following description, the scheduling 105 means performing operations of (1) to (3) described below.

(1) The DR controller 200, for each time step, assigns one or more DR contracts to a control block of each appliance.

(2) The DR controller 200, for each time step, determines the amount of the DR contract assigned to each control block.

(3) The DR controller 200, for each time step, generates a combination of optimized DR contracts (DR scenario). The DR scenario is disclosed to the DR aggregator (DR purchaser), as a DR service that can be provided by the DR provider.

Final selection of a DR scenario is determined according to an object of the DR provider. In addition, optimization of the DR scenario performed prior to the final selection is performed in consideration of constraints of the DR contract included in the DR scenario. Such constraints include the constraints based on mutual effects of the multiple DR contracts and the appliance.

The multiple DR contracts 101a to 101n presented by the DR aggregator described above are scheduled to be implemented in the same time step (target period) in the future.

The DR controller 200 performs scheduling of the DR contracts and creates an optimal DR scenario.

The DR controller 200 causes the appliances 104a to 104y to operate based on the optimal DR scenario. Supply and demand for electrical energy in the electrical energy system is adjusted by the DR controller 200 causing the appliances 104a to 104y to operate based on the optimal DR scenario, and the total amount of adjustment of each of the appliances 104a to 104y is monitored by the electrical energy meter 103.

The DR aggregator obtains the amount of adjustment of the supply and demand for electrical energy from the electrical energy meter 103, and checks whether the obtained amount of adjustment complies with the contract condition of the DR contract. When the obtained amount of adjustment complies with the contract condition of the DR contract, the DR provider receives an incentive from the DR aggregator.

Figure 2:
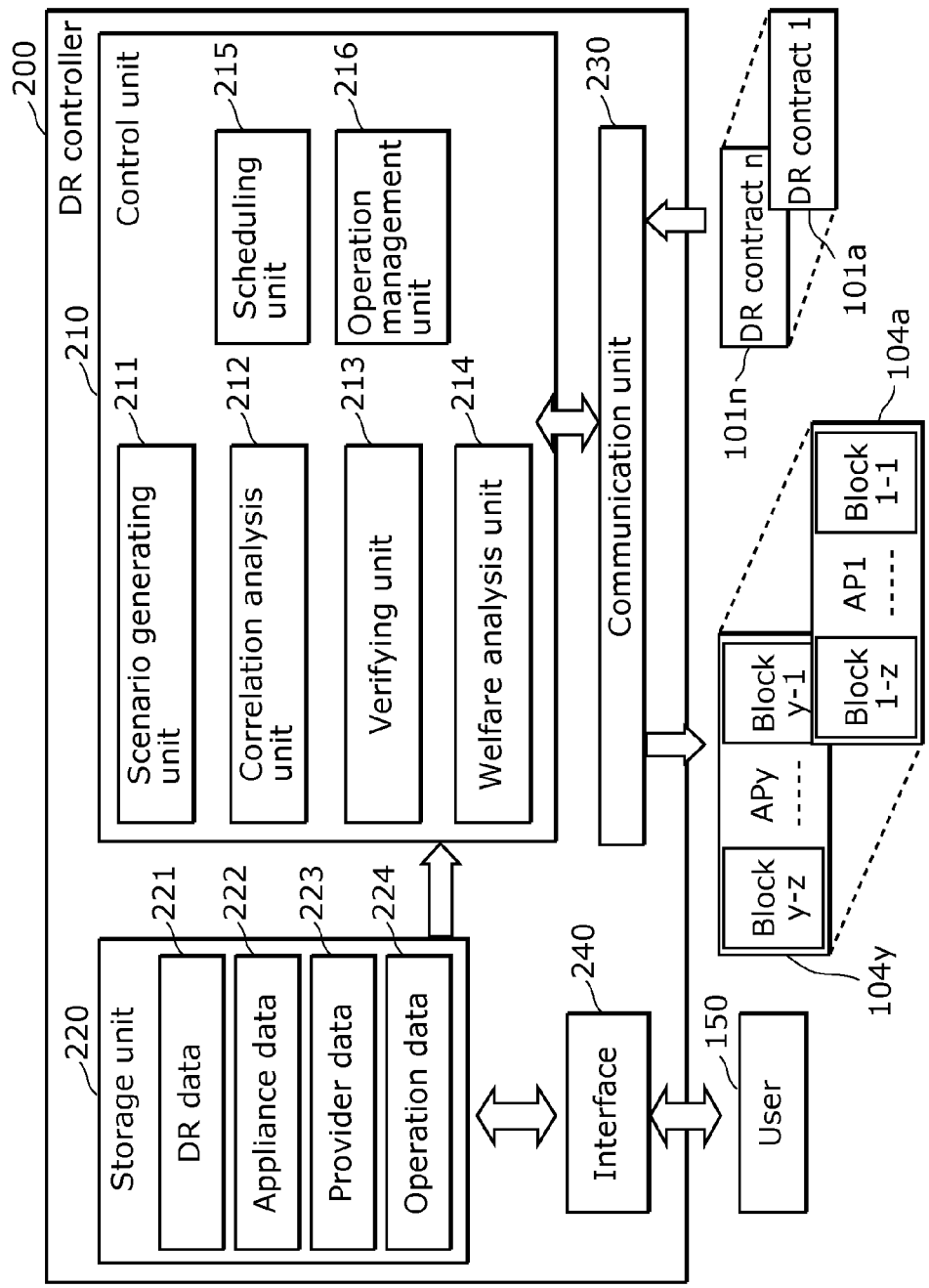
FIG. 2 is a block diagram illustrating a functional configuration of a DR controller according to the exemplary embodiment.

Next, a functional configuration of the DR controller will be described. FIG. 2 is a block diagram illustrating the functional configuration of a DR controller according to the exemplary embodiment.

The DR controller 200 includes: a control unit 210; a storage unit 220; and a communication unit 230. As illustrated in FIG. 2, the DR controller 200 may include an interface 240 which receives an input provided by a user 150 (DR provider).

The following describes the structural elements with a focus on main elements.

[Storage Unit 220]

The storage unit 220 stores: DR data 221; appliance data 222; provider data 223; and operation data 224.

The DR data 221 includes data items such as one or more items of DR contractual data (DR contract context data) obtained from the server 100, and DR contractual data implemented in the past.

The appliance data 222 includes data items such as: appliance specification data; appliance operation context data; appliance use pattern data, and so on.

The provider data 223 includes data items such as: set points for appliances of the DR provider; load utilization pattern, energy utilization pattern, and appliance utilization pattern of the DR provider; response data to DR event of the DR provider; welfare set points of the DR provider; DR related desired set points, and so on.

The operation data 224 includes data items such as: operation schedules, status, performance data, and other data items required by the DR controller 200 for operation, and so on.

It is to be noted that the storage unit 220 includes storage device such as a semiconductor memory, a ferroelectric memory, or the like.

[Communication Unit 230]

The communication unit 230 obtains, from the server 100, multiple DR contracts scheduled to be implemented in a target period. In addition, the DR controller 200 controls the appliance via the communication unit 230. The communication unit 230 is a general purpose communication module, for example, and performs wired or wireless communication with the server 100 of the DR aggregator and the appliance.

[Control Unit 210]

The control unit 210 includes: a scenario generating unit 211; a correlation analysis unit 212; a verifying unit 213; a welfare analysis unit 214; a scheduling unit 215; and an operation management unit 216. The following describes in detail each of the structural elements of the control unit 210.

[Scenario Generating Unit 211]

The scenario generating unit 211 first determines whether or not each control block of appliances 104a to 104y (hereinafter also simply referred to as each control block) is technically eligible to take part in DR contracts x (101a to 101n).

For example, when the contractual coverage of the DR contract is FR regulation for performing charging or discharging based on an order value, only an appliance capable of both charging or discharging can take part in this DR contract. More specifically, the secondary battery system can take part in such a DR contract, but an air conditioner or a television cannot take part in such a DR contract because they are not capable of performing discharging.

The scenario generating unit 211, to be specific, verifies one of (or both of) the following items (1) and (2) as determination of presence or absence of technical eligibility.

(1) An amount of electrical energy which corresponds to a minimum/maximum required amount or demand shape of electrical energy necessary for the contractual coverage of the DR indicated by the DR contract and which can be handled (controllable) by each control block.

(2) A response speed which corresponds to a lowest required response speed or a highest required response speed of electrical energy necessary for the contractual coverage of the DR indicated by the DR contract and which can be handled (controllable) by each control block.

In addition, items (3) and (4) below may be verified using the DR contractual data implemented in the past and included in the DR data 221 stored in the storage unit 220.

(3) Most probable time periods that control might be performed based on the DR contract, compared to most probable time periods in which the appliance (control block) will be available for the DR contract.

(4) Most probable duration that DR control might be performed based on the DR contract, compared to the most probable duration that the appliance (control block) will be available for DR contract.

It is to be noted that, for the scenario generating unit 211 to perform the determination as described above, the DR contractual data needs to include activation condition for the DR control and required performance of the DR control.

In addition, for the scenario generating unit 211 to perform the determination as described above, the appliance data 222 (context data) needs to include data items as below.

(1) Limit specification for electrical energy consumption, electrical energy accumulation, and electrical energy generation/supply for the appliance (for example, maximum and minimum limits of a supply amount and consumption amount of electrical energy, maximum and minimum limits of charge and discharge of electrical energy, and maximum and minimum limits of charge and discharge rate)

(2) Actual data of electrical energy consumption, electrical energy accumulation, and electrical energy generation/supply for the appliance (for example, a consumption amount of electrical energy in a time step, a supply amount of electrical energy in a time step, available charge and discharge amount, and a controllable consumption amount of electrical energy, a controllable supply amount of electrical energy, and a controllable charge or discharge amount)

It is to be noted that the appliance data 222 may include data items below.

(1) The probability of utilizing appliance on each time step (for example, calculated from previous load data of the DR provider (user))

(2) The probability distribution function of the duration in which the appliance will be utilized (for example, calculated from previous load data of the DR provider (user))

The scenario generating unit 211, based on the data items as described above, generates a list of DR scenarios each of which is a combination of two or more DR contracts which satisfy the technical conditions (which are technically implementable).

In other words, the scenario generating unit 211 first obtains multiple DR contracts scheduled to be implemented in a target period (time step). Next, the scenario generating unit 211 determines, for each of the obtained multiple DR contracts, whether or not adjustment of supply and demand for electrical energy required in the DR contract is implementable using at least one appliance. Then, the scenario generating unit 211 generates, based on a result of determination, a DR scenario which is a combination of two or more DR contracts and which can be implemented in a target period (time step) using at least one appliance.

Figure 3:
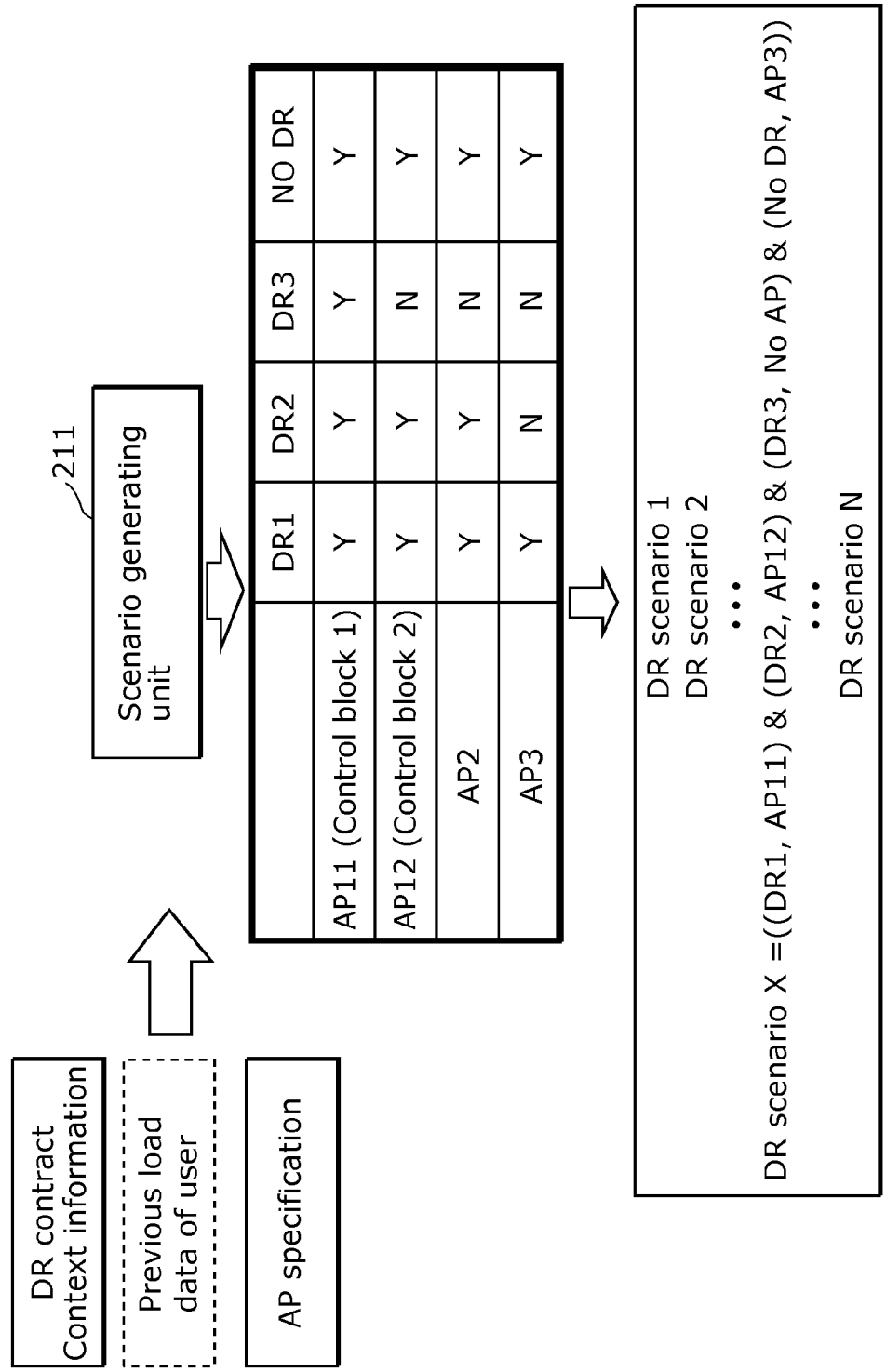
FIG. 3 is a diagram illustrating an example of a result of determination (technical matching matrix) by a scenario generating unit.

FIG. 3 is a diagram illustrating an example of a result of determination (technical matching matrix) by a scenario generating unit 211. In FIG. 3, "Y" indicates that the appliance is technically compliant with the DR contract and "N" indicates that the appliance is not technically compliant with the DR contract. It is to be noted that AP11 means the control block 1 of the appliance 1.

[Correlation Analysis Unit 212]

The correlation analysis unit 212 analyzes a correlation of the DR contract, and deletes, from the first list of DR scenarios, a DR scenario including a combination of DR contracts which cannot be satisfied at the same time. The correlation analysis unit 212 checks the correlation of the DR contracts based on the DR contractual data.

The DR contractual data includes one of (or all of) the items (1) to (3) below.

(1) Maximum or minimum limit on the amount of modification of consumption of electrical energy or supply of electrical energy (2) Maximum or minimum limit on the duration of modification of consumption of electrical energy or supply of electrical energy (3) Maximum or minimum limit on the speed of modification of consumption of electrical energy or supply of electrical energy Subsequent to analyzing the correlation of the above-described contracts, the correlation analysis unit 212 deletes the DR scenario including the combination of contracts which cannot be satisfied at the same time, thereby updating the list of the DR scenarios.

Here, a specific example of the combination of DR contracts which cannot be satisfied at the same time will be described. It is assumed that a DR scenario includes two DR contracts, the DR contract 1 (DR1) and the DR contract 2 (DR2). Here, the DR 1 is a DR contract which requires demand reduction (reduction in consumption amount of electrical energy) by at least 2 kW. In contrast, the DR2 is a DR contract which requires demand reduction by greater than 0 kW.

Meanwhile, it is assumed that the DR provider has two appliances each of which is capable of controlling demand of 1 kW, and these appliances (AP1 and AP2) have the technical ability to attend in any one of DR 1 and DR 2 (in other words, the control block AP1 and AP2 are capable of controlling demand of 1 kW and attending in DR1).

In sum, in order to implement DR1, both of AP1 and AP2 need to be assigned to DR1. When AP1 cannot be assigned to DR1, it is not possible to implement DR1 even if AP2 is assigned to DR1. In other words, it is not possible to implement both of DR1 and DR2 by AP1 and AP2.

As described above, correlation can exist between different DR contracts. In this case, since the correlation condition of the DR contracts is not meet, DR scenarios of (DR1, AP1) & (DR2, AP2) and (DR2, AP1) & (DR1, AP2) should be deleted. In the above-described example, the list of DR scenarios prior to taking the correlation of the DR contracts into consideration is as follows.

DR scenario 1: (No DR, AP1) & (No DR, AP2)
DR scenario 2: (DR1, AP1) & (DR1, AP2)
DR scenario 3: (DR2, AP1) & (DR2, AP2)
DR scenario 4: (DR1, AP1) & (DR2, AP2)
DR scenario 5: (DR2, AP1) & (DR1, AP2)

Subsequent to taking into the contract correlations, the DR scenario 4 and the DR scenario 5 are deleted from the list of DR scenarios. Accordingly, the list of DR scenarios after updated by the correlation analysis unit 212 includes the DR scenario 1, the DR scenario 2, and the DR scenario 3.

Figure 4:
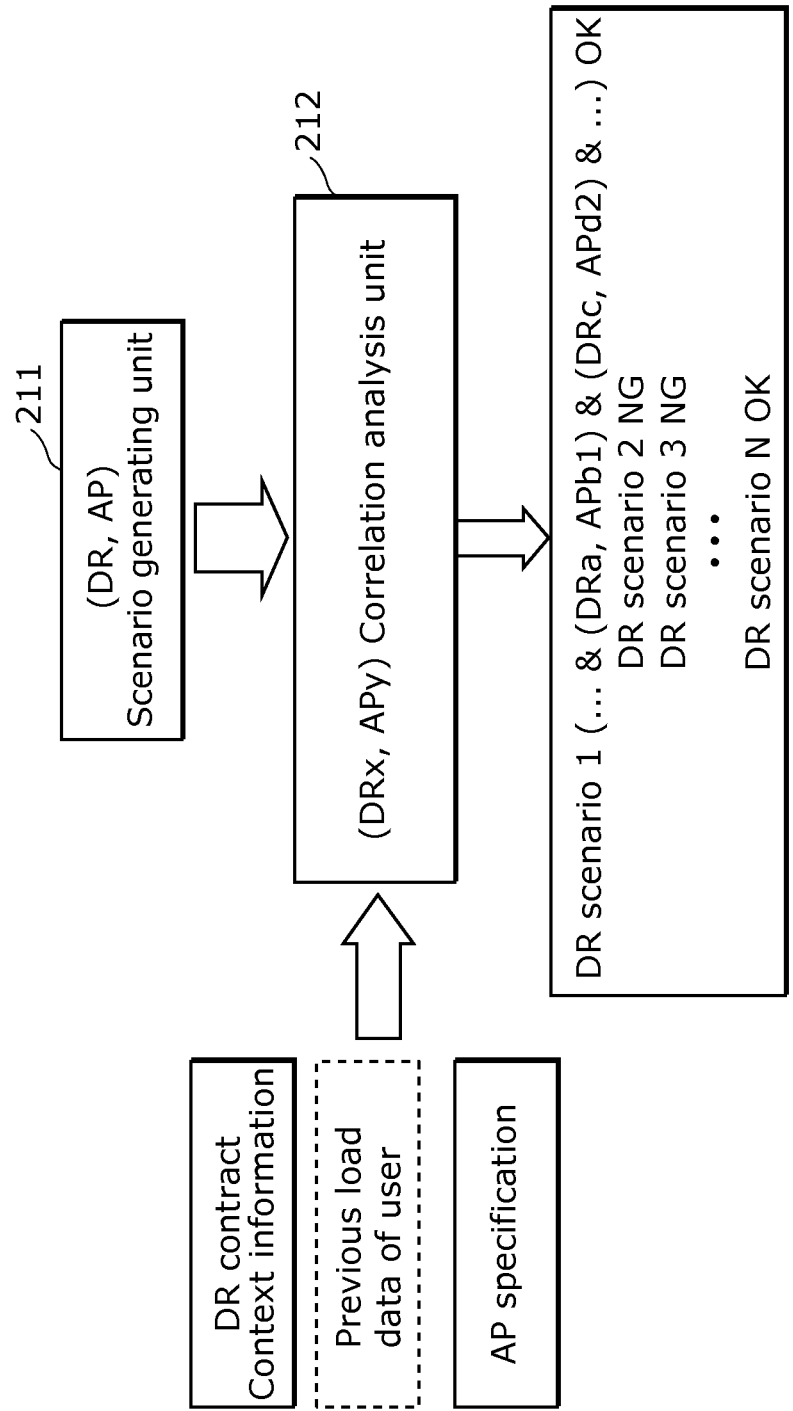
FIG. 4 is a diagram conceptually illustrating an operation of a contract correlation analysis unit.

FIG. 4 is a diagram conceptually illustrating an operation of the correlation analysis unit 212 as described above. For each of the multiple DR contracts illustrated in FIG. 4, the diagram shows whether or not each of the appliances is capable of implementing the content of adjustment of supply and demand for electrical energy requested by the DR contract.

[Verifying Unit 213]

The verifying unit 213 analyzes the correlation of aggregated load and energy modification when different DR contracts are carried out in one premise 102.

In the DR contracts, different adjustment content of supply and demand for electrical energy is requested for each type of DR contracts. For example, in the case where the DR contract is peak cut, requested adjustment content is reducing demand in specific time and duration. On the other hand, requested adjustment content in the case of FR regulation is increasing and decreasing demand according to an order value (order signal) from outside.

Here, the DR aggregator (DR purchaser) checks the content of adjustment using the electrical energy meter 103 (system connecting point), and determines whether or not the content of adjustment performed by the DR controller 200 (DR provider) meets the contract conditions.

Here, in the case where all the appliances in the premise 102 carry out the same type of DR contract (or simply, nothing is carried out), whether or not the content of adjustment meets the contract conditions can be easily verified.

However, when different appliances carry our different DR contracts, the content of adjustment at the electrical energy meter 103 should be forecasted. This is because the DR aggregator, as described above, checks whether or not the content of adjustment carried out by the DR controller 200 (DR provider) meets the contract conditions using the electrical energy meter 103.

In order for the DR provider to receive the incentive based on the DR contract, the amount of adjustment of supply and demand for electrical energy monitored by the electrical energy meter 103 should comply with the contract conditions. Even when the amount of adjustment of supply and demand for electrical energy complies with the contract conditions at the output terminal of the appliance carrying out the DR contract, it is not necessarily complying with the contract conditions when viewed by the DR aggregator. If the amount of adjustment of supply and demand for electrical energy monitored by the electrical energy meter 103 does not comply with the contract conditions, the DR provider not only cannot receive the incentive but also may face a penalty.

For example, demand for the electrical energy system should be reduced in specific time and duration in the case where the DR contract is peak cut, and when the demand for the electrical energy system increases (compared to the case where no adjustment for supply and demand for electrical energy is carried out) as a result of the adjustment of supply and demand for electrical energy, it is not accepted as complying with the contract conditions.

Thus, in the case where multiple DR contracts are carried out using multiple appliances placed in the single premise 102, whether or not the amount of adjustment of supply and demand for electrical energy meets all the adopted contract conditions should be verifiable by the electrical energy meter 103 corresponding to the premise 102.

Here, an example of DR contracts of which the amount of adjustment of supply and demand for electrical energy does not meet the contract conditions when carried out at the same time.

Figure 5:
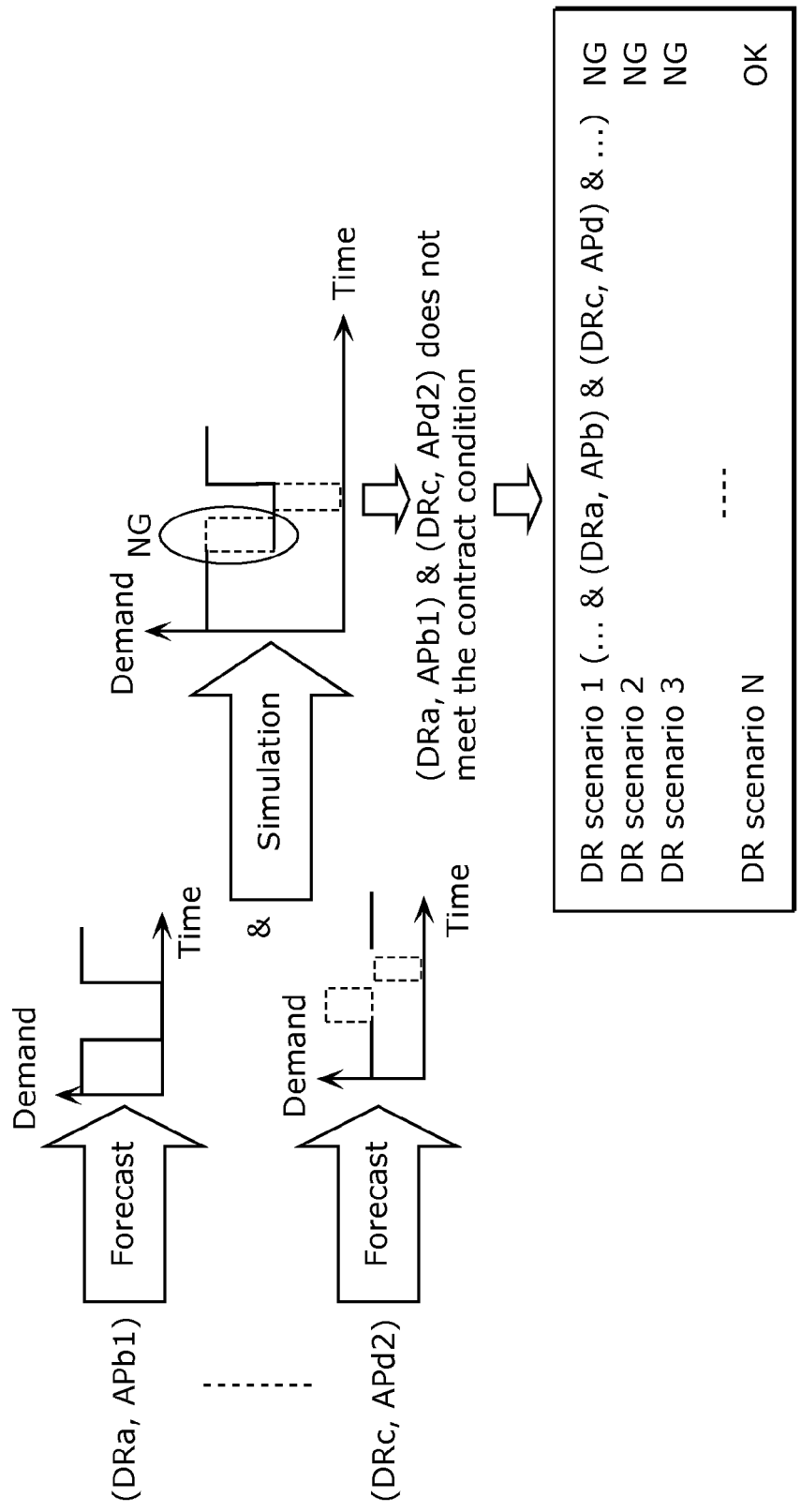
FIG. 5 is a diagram for explaining an example of a DR scenario not meeting a contract condition of an amount of adjustment of supply and demand for electrical energy.

FIG. 5 is a diagram for explaining an example of a DR scenario not meeting the contract conditions of the amount of adjustment of supply and demand for electrical energy.

For example, if the DR contract of peak cut and the DR contract of FR regulation are carried out at the same time, the amounts of adjustment are mutually neutralized in some cases. More specifically, as illustrated in FIG. 5, in the case where demand reduction (DRa, APb1) for peak cut by one appliance coincides with demand increase (DRc, APd2) for FR regulation by another appliance, the amounts of adjustment neutralize each other.

Such "correlation" is called "aggregated load and energy modification correlation", and the verifying unit 213 takes the aggregated load and energy modification correlation into consideration when performing multiple DR contracts at the same time.

The verifying unit 213 analyzes the amount of adjustment of supply and demand for electrical energy when different DR contracts are overlapped, and deletes a DR scenario including a DR contract of which the amount of adjustment of supply and demand for electrical energy monitored by the electrical energy meter 103 does not meet the contract conditions, thereby updating the list of DR scenarios. Thus, the updated list of DR scenarios includes only the DR scenarios which include the DR contracts meeting the contract conditions.

The verifying unit 213 forecasts the effect of each (DRx, APyz) on change in load, energy, or processing capacity of the appliance. In addition, the verifying unit 213 simulates aggregated combinations of (DRx, APyz). Further, in the case where the aggregated load or energy modification of any of the combinations of (DRx, APyz) is contrary to the contract conditions of the DR contract, the verifying unit 213 deletes the DR scenario including this combination of (DRx, APyz).

Verification by the verifying unit 213 is performed on all of the DR scenarios included in the list of DR scenarios updated by the correlation analysis unit 212.

As described above, the verifying unit 213 extracts, from among multiple DR scenarios, a DR scenario of which the total value (a value measured by the electrical energy meter 103) of the amount of adjustment of supply and demand for electrical energy of each appliance meets the contract conditions of two or more DR contracts included in the DR scenario when the appliance is operated based on the DR scenario.

It is to be noted that the verifying unit 213 may incorporate a load deviation factor which can possibly be resulted in due to unpredictable human behavior, in load and energy modification forecasting of the (DRx, APyz) combination. For example, the verifying unit 213 may assign a load deviation factor to important parameters such as utilization time, utilization duration, base demand and available energy of each appliance, and incorporate it into the load and energy modification forecasting. These load deviation factors can be obtained from previous load data of the DR provider.

In addition, the verifying unit 213, from the view point of the aggregated load and energy modification, also generates a revision of a DR scenario which has been modified such that the DR scenario meets the contract conditions of the DR contract, by taking the previous data into consideration. In sum, according to the exemplary embodiment, the verifying unit 213 modifies the DR scenario, if possible, instead of simply deleting the DR scenario.

It is to be noted that, in this embodiment, at the time of changing the DR scenario, the verifying unit 213 calculates the amount (electrical energy) of aggregated load and energy modification actually required such that the change in the aggregated load and the energy modification meet the contract conditions. In calculating the amount of the aggregated load and the energy modification at this time, consistency with a result of analysis of each (DRx, APyz) performed by the scenario generating unit 211 is taken into account.

In addition, in generating the revision of the DR scenario, a result of analysis performed by the correlation analysis unit 212 is also taken into account. When the revision of the DR scenario is consistent with the result of analysis performed by the correlation analysis unit 212, the verifying unit 213 adds the scenario of the revision to the list of DR scenarios.

For example, the following describes modification of a DR scenario of which AP1 is assigned to a DR contract of 1 kW peak cut and AP2 is assigned to a DR contract of 1 kW FR regulation. It is to be noted that, in the description below, each of the appliances of AP1 and AP2 is assumed to have only one control block.

Theoretically, even if AP1 reduces 1 kW demand, the reduction might be neutralized by 1 kW demand increase of AP2 based on the FR regulation. Thus, the verifying unit 213 first marks this DR scenario that can possibly fail to meet the contract condition. Then, the verifying unit 213 modifies this DR scenario according to the following order.

1. The verifying unit 213 checks whether or not AP1 is capable of reducing demand by 2 kW.
2. The verifying unit 213 generates a revision of the DR scenario as below, of which demand to be reduced by AP1 is modified to 2 kW so that 1 kW of peak cut can be sold to the DR aggregator.

2 kW(AP1 demand reduction)−1 kW(AP2 demand increase)=1 kW(peak cut deliverable by AP1)

This can create a new DR scenario (revision of the DR scenario) of which the actual load reduction of the appliance is 2 kW, but 1 kW demand is reduced by the peak cut at the electrical energy meter 103.

Here, the verifying unit 213 checks whether or not the revision of the DR scenario meets the contract conditions in terms of the DR contract of peak cut. If this DR scenario meets the contract conditions of peak cut, this revision of DR scenario is added to the list of scenarios.

Figure 6:
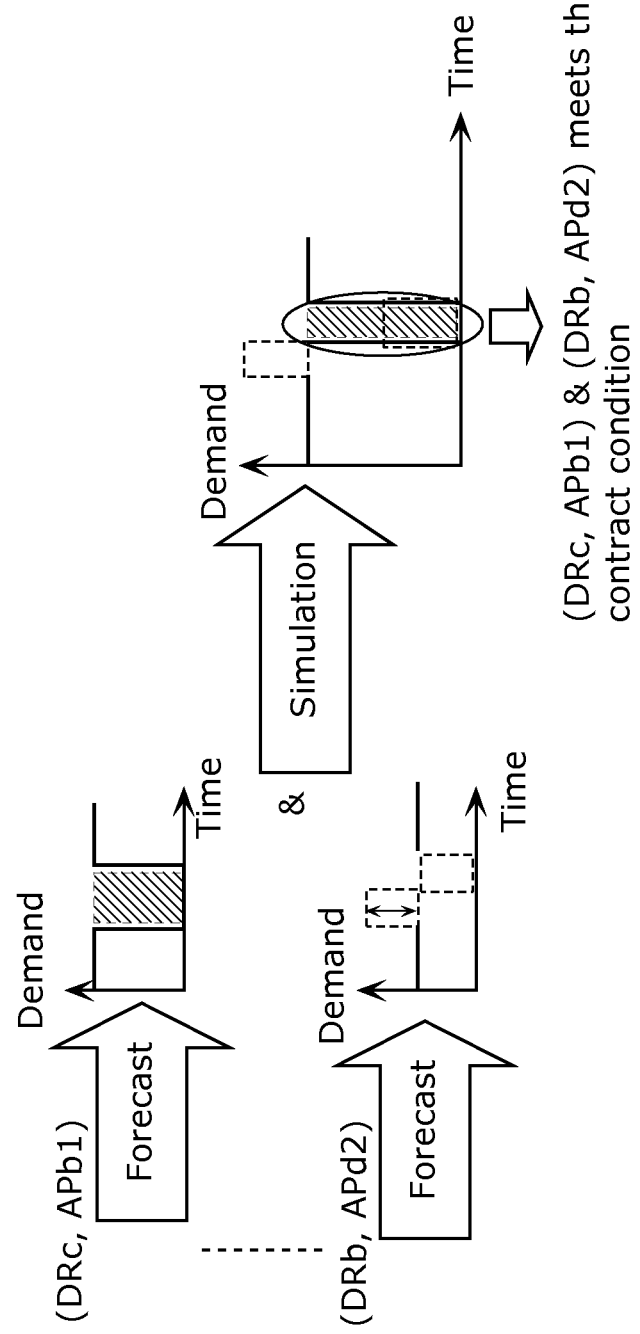
FIG. 6 is a diagram for explaining another example of modification of DR scenario.

Next, another example of modification of a DR scenario will be explained. FIG. 6 is a diagram for explaining another example of modification of DR a scenario.

In FIG. 6, DRc is a DR contract having a contract condition of, for example, reducing electrical energy by a total of 2 kWh in a predetermined period. On the other hand, DRb is a DR contract of FR regulation, and is expected to increase demand in the first half of a period and decrease demand in the second half of the period.

As illustrated in FIG. 6, when reduction of electrical energy by 2 kWh requested by DRc is focused on a period in which demand expected by DRb is expected to be decreased, both of the contract condition of DRc and the contract condition of DRb are satisfied. Thus, the verifying unit 213 generates a revision of the DR scenario of which reduction of electrical energy by 2 kW requested by DRc is focused on the period in which demand expected by DRb is expected to be decreased.

As described above, the verifying unit 213 may modify, within a range that meets the contract conditions, the DR scenario such that a period in which demand is decreased in one DR contract matches (conforms to) a period in which demand is decreased in another DR contract. With this, the verifying unit 213 is capable of preventing the amount of adjustment of supply and demand for electrical energy from being neutralized due to overlapping of the period in which demand is increased and the period in which demand is decreased.

It is to be noted that the verifying unit 213 may obtain a combination of (DRx, APyz) which is least likely to meet the contract conditions. The verifying unit 213 generates a table to assign a failure factor to each combination, and then delete a scenario with a higher failure factor. This table may be updated based on an arbitrary parameter such as a result of each DR event, change in specification of an appliance, a DR contract, and so on.

[Welfare Analysis Unit 214]

The welfare analysis unit 214 analyzes a change in welfare when multiple DR services are scheduled and a correlation assumed based on the change in welfare. The welfare analysis unit 214 checks whether or not the list of DR scenarios updated by the verifying unit 213 meets welfare criteria of the DR provider.

Each electric appliance has an effect on DR provider's welfare. In addition, the combinations of different electrical appliances and working condition of each appliance also have an effect on DR provider's welfare.

For example, the case is assumed where the appliances implementing a DR contract includes an air-conditioning device (air conditioner) and an electric fan, and both the air conditioner and the electric fan are capable of implementing the DR contract of peak cut. In this case, if both of the air conditioner and the electric fan are assigned to peak cut, there is a possibility that the welfare for the DR provider decreases excessively. The welfare analysis unit 214 deletes, from the list of DR scenarios, such a DR scenario that significantly damages welfare, for example.

It is to be noted that the DR provider (user 150) may specify the welfare criteria to the DR controller 200 via the interface 240. With this, the DR provider can delete (DRx, APyz) which fails to meet the welfare condition and the combination of (DRx, APyz) which fails to meet the welfare condition, from the list of DR scenarios.

The DR provider inputs a level of its own welfare (life welfare set point) through the interface 240, for example. Then, the welfare analysis unit 214 forecasts the effect of each combination of (DRx, APyz) and (DRx, APyz) on the welfare of the DR provider. Then, the welfare analysis unit 214 deletes a scenario that has a forecasted welfare level lower than the welfare set points (threshold) provided by the DR provider.

It is to be noted that forecast of welfare may be carried out using parameters such as an air temperature, humidity, in-room light intensity, a period in which an appliance is unavailable due to the effect of (DRx, APyz) (a period in which an appliance performing air conditioning is unavailable), and based on forecasting of change in these parameters and simulation.

In addition, the welfare analysis unit 214 may delete the DR scenario using DR history data. In this case, the welfare analysis unit 214 extracts the combination of (DRx, APyz) and (DRx, APyz) which has higher probability to be deleted from the list of DR scenarios, based on the history of the welfare set point provided by the DR provider in the past.

More specifically, the welfare analysis unit 214 assigns one parameter of "acceptability weighting factor" for each of the extracted (DRx, APyz). The "acceptability weighting factor" indicates that the higher a value is, the less likely the DR scenario is to be deleted from the list of DR scenarios.

Then, the welfare analysis unit 214 extracts the DR scenario with a high probability of being deleted from the list of DR scenarios, based on the above-described "acceptability weighting factor" (for example, based on a total of acceptability weighting factors of the DR contracts included in the DR scenario).

In addition, the welfare analysis unit 214 extracts a weighting factor referred to as a "correlated acceptability weighting factor" which is different from the "acceptability weighting factor". The "correlated acceptability weighting factor" indicates that the higher a value is, the less likely the DR scenario is to be deleted from the list of DR scenarios.

In this embodiment, the welfare analysis unit 214 calculates the correlated acceptability weighting factor for different combinations of (DRx, APyz) using the DR history data. Then, the combination of (DRx, APyz) with a small correlated acceptability weighting factor is flagged as "poor welfare" and is deleted automatically prior to forecasting the welfare.

As described above, in this embodiment, the welfare analysis unit 214 has learning ability and can update the correlated acceptability weighting factor every time a DR scenario is implemented.

The following describes a specific example of the correlated acceptability weighting factor. For example, the DR contract of peak cut using an air conditioner has a small acceptability weighting factor of (peak cut, air conditioner) due to the poor welfare for the DR provider. In addition, the DR contract of peak cut using an electric fan has little effect on welfare, and thus the acceptability weighting factor of (peak cut, electric fan) is large.

It is assumed here that, according to the DR history data, all of the combinations of (peak cut, air conditioner) and (peak cut, electric fan) are deleted from the list of DR scenarios based on the inputs of welfare set points by the DR provider. In this case, the welfare analysis unit 214 learns that the correlated acceptability weighting factor of the combination of (peak cut, air conditioner) and (peak cut, electric fan) has a value of 0.

Then, any DR scenarios including the combination of (peak cut, air conditioner) and (peak cut, electric fan) are deleted by the welfare analysis unit 214.

Hereinbefore, operations of the correlation analysis unit 212, the verifying unit 213, and the welfare analysis unit 214 have been described. With the correlation analysis unit 212, the verifying unit 213, and the welfare analysis unit 214, it is possible to reduce the number of DR scenarios and calculation load of the DR controller 200.

It is to be noted that the order of operations performed by the correlation analysis unit 212, the verifying unit 213, and the welfare analysis unit 214 are not limited to those described above, and may be switched between them.

The following described the scheduling unit 215 and the operation management unit 216 of the control unit 210.

[Scheduling Unit 215 and Operation Management Unit 216]

The scheduling unit 215 performs scheduling of selecting one DR scenario from among the DR scenarios included in the list of DR scenarios (hereinafter also referred to as optimization scenarios) updated by analysis performed by the correlation analysis unit 212, the verifying unit 213, and the welfare analysis unit 214. The scheduling unit 215 assigns each appliance (each control block) to the DR contracts included in the DR scenario, and also determines a total amount of each of the DR contracts to be sold to the DR aggregator (DR purchaser). It is to be noted that the selecting of a DR scenario performed by the scheduling unit 215 is carried out in consideration of an object of the DR provider (selection criteria of a DR scenario such as an incentive to be obtained).

In this embodiment, the scheduling unit 215 calculates a total of the incentive (final benefit) to be obtained for each DR scenario, and selects the most profitable DR scenario. In other words, scheduling unit 215 selects, from among the optimization scenarios, an optimization scenario with the highest incentive to be obtained.

At this time, the scheduling unit 215 uses context data (including information of incentives and penalties) of the DR contract stored in the storage unit 220 and the total amount of each feasible DR contract.

It is to be noted that the scheduling unit 215 may select, from among the optimization scenarios, an optimization scenario of which an incentive to be obtained is greater than or equal to a predetermined value.

In addition, the scheduling unit 215, for example, may select a DR scenario based on the above-described welfare as the selection criteria of the DR scenario. More specifically, the scheduling unit 215 may select, from among the optimization scenarios, one optimization scenario of which a time period for conducting adjustment of supply and demand for electrical energy by shutting down the appliance is shorter than a predetermined time period. More specifically, the scheduling unit 215 may select, from among the optimization scenarios, one optimization scenario of which the time period for conducting adjustment of supply and demand for electrical energy by shutting down a specific device, as an example air-conditioning device, is shortest.

In addition, the scheduling unit 215 may select a DR scenario based on a weighted sum of a plurality of parameters as the selection criteria. In this case, the DR provider (user 150) quantifies the DR provider's various objects (incentive, reduction in $CO_2$, welfare, and so on) as parameters, and inputs a desired weighting for these parameters. Then, the scheduling unit 215 calculates, for each of the DR scenarios included in the list of DR scenarios, an evaluation value (weighted sum of parameters) of the DR scenario. Then, the scheduling unit 215 selects a DR scenario with the highest evaluation value.

Examples of the objective function include: minimizing energy cost; maximizing incentive that a user can receive; minimizing $CO_2$ emission (largest amount of reduction in $CO_2$); maximizing user's welfare and so on.

In addition, according to the exemplary embodiment, the scheduling unit 215 further selects a DR scenario which complies with the selection criteria second best, in addition to a DR scenario which best complies with the selection criteria. The DR controller 200 transmits, to the DR provider (user 150), the DR scenario which best complies with the selection criteria via the interface 240 or the communication unit 230.

In the case where the DR scenario selected by the scheduling unit 215 is rejected by the DR provider, the scheduling unit 215 transmits the second best DR scenario to the DR provider which complies with the selection criteria.

The operation management unit 216 carries out the DR scenario which is ultimately selected. More specifically, the operation management unit 216 causes the appliance to operate in a time step (target period), based on the scenario ultimately selected by the scheduling unit 215.

In addition, the operation management unit 216 manages other tasks related to operation, when the DR scenario is carried out (operated). The other tasks here include: generation of a DR activation signal to be transmitted to an appliance; monitoring of a DR scenario being executed (an appliance in operation); and fixing of a DR scenario in case of deviation from schedule. In addition, the above-described other tasks include: generation of feedback data transmitted from one or more DR aggregators (DR purchaser); deciding about how to proceed with the operation if any change happens during the execution of a DR scenario; and so on.

[Operation]

Next, an operation sequence of the DR system overall including the DR controller 200 and a flowchart of an operation of the DR controller 200 will be described.

Figure 7:
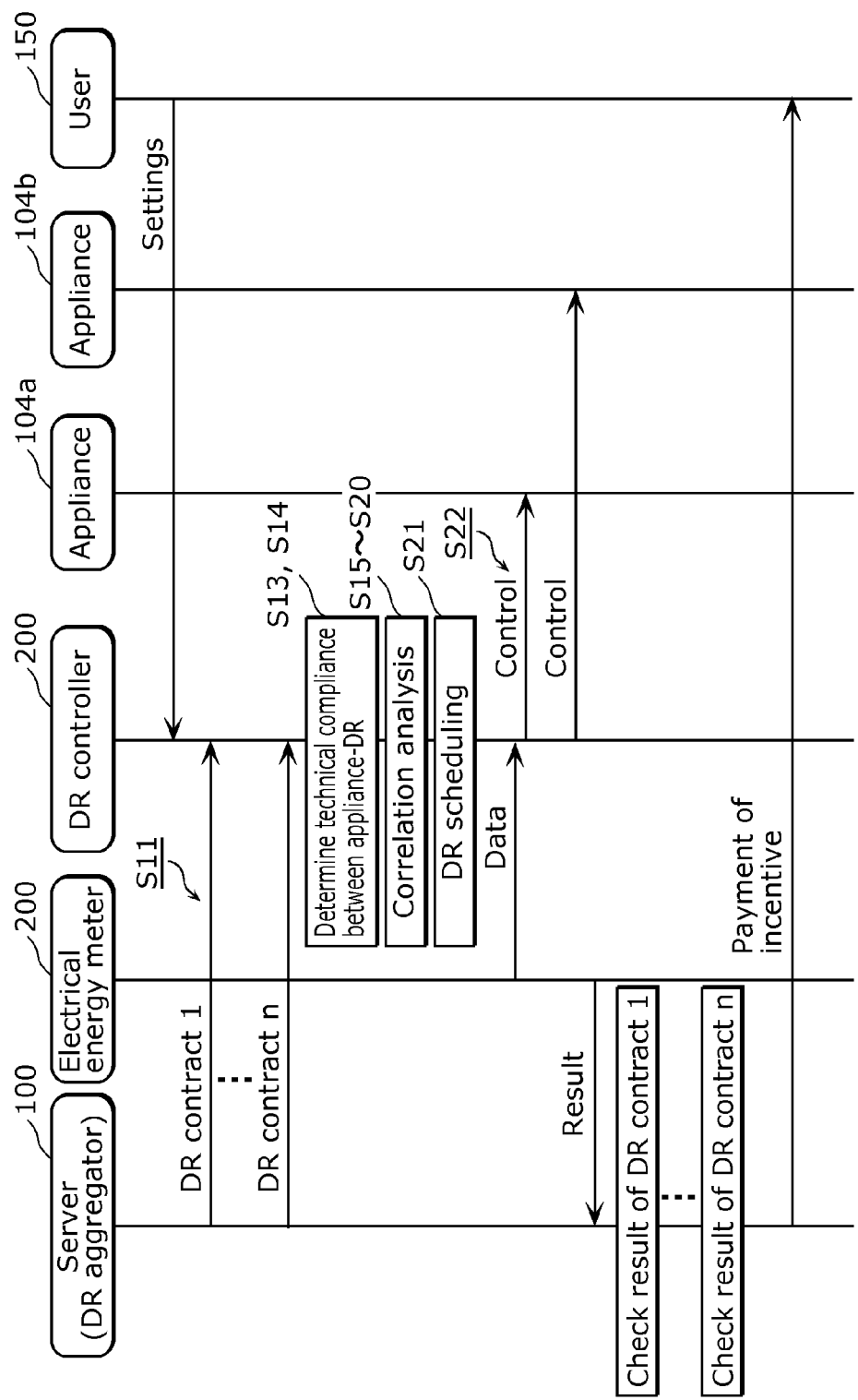
FIG. 7 is a sequence diagram of the DR system as a whole according to the exemplary embodiment.
Figure 8:
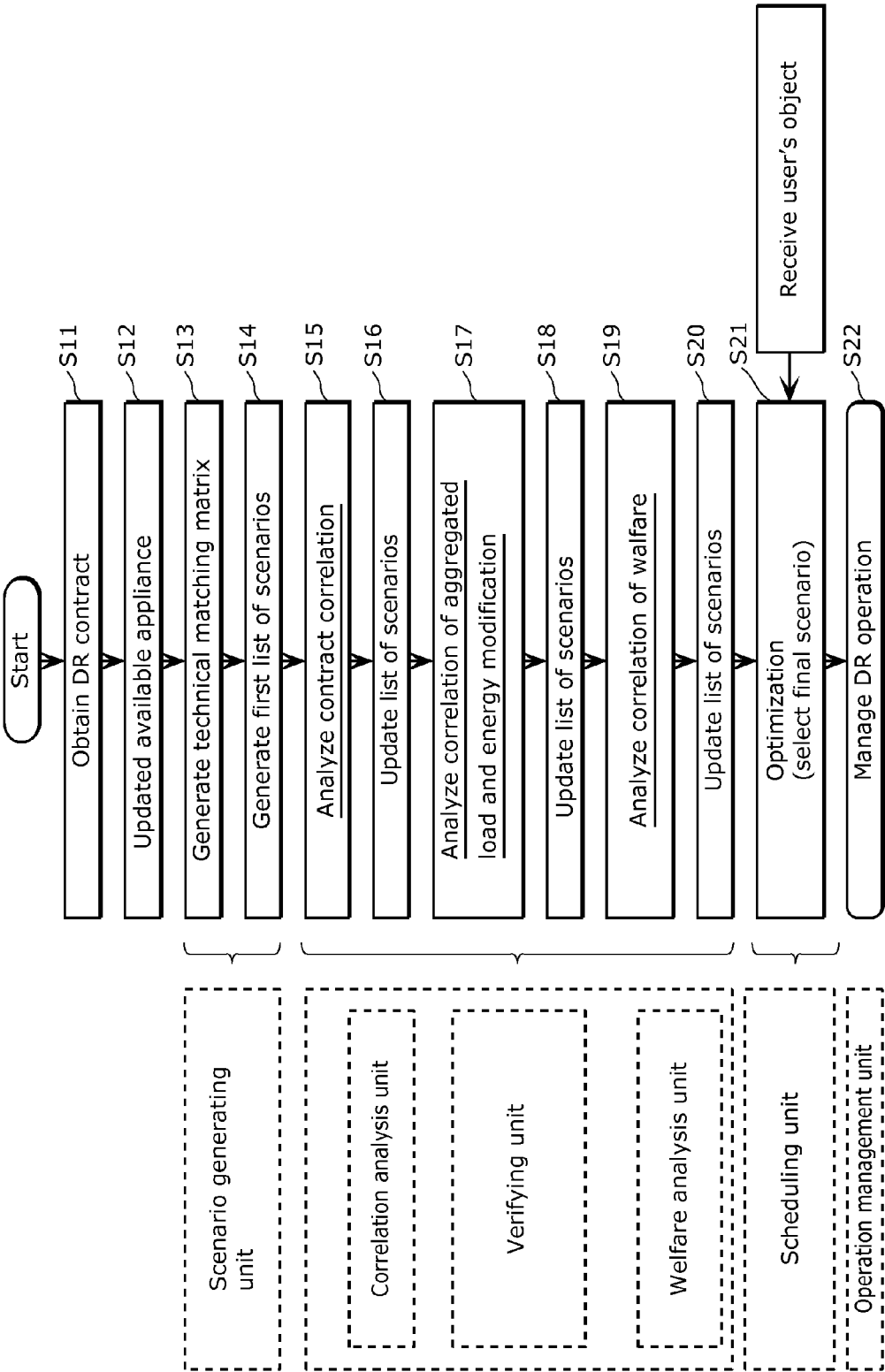
FIG. 8 is a flowchart of an operation of the DR controller according to the exemplary embodiment.

FIG. 7 is a sequence diagram of the DR system as a whole. FIG. 8 is a flowchart illustrating an operation of the DR controller 200.

First, the DR controller 200 obtains at least one DR contract from the storage unit 220 (S11). Then, the DR controller 200 obtains updated context data of an appliance to be controlled (S12). The DR controller 200, upon receiving the context data of the appliance, generates a technical matching matrix (S13), and generates the first list of DR scenarios (S14).

Then, the DR controller 200 analyzes contract correlation (S15), and updates the list of DR scenarios (S16).

Next, the DR controller 200 analyzes the aggregated load and energy modification of the system connecting point (electrical energy meter 103)(S17), and updates the list of DR scenarios (S18).

Then, the DR controller 200 analyzes welfare correlation (S19), and updates the list of DR scenarios (S20). The updated list of DR scenarios includes only an optimization scenario.

Next, the DR controller 200 performs DR scheduling of which one DR scenario is selected as a final scenario from among the list of DR scenarios updated in Step S20 (S21).

Then, the DR controller 200 causes an appliance to operate according to the selected DR scenario. The DR scenario being executed is managed by the DR controller 200 (S22).

As described above, the DR controller 200 determines whether or not a total value of the amount of adjustment of supply and demand for electrical energy for each appliance of the DR provider satisfies the contract condition of each of two or more DR contracts included in the DR scenario. With this, the DR controller 200 is capable of executing, condition in one time step, multiple DR contracts each of which satisfies the contract condition.

It is to be noted that, in the above-described exemplary embodiment, the scenario generating unit 211 corresponds to an obtaining unit, a determining unit, and a generating unit, and the verifying unit 213 corresponds to an extracting unit. In addition, the scheduling unit 215 and the operation management unit 216 corresponds to an operating unit.

(Modifications)

The present invention is not limited to the above-described exemplary embodiment.

Figure 9:
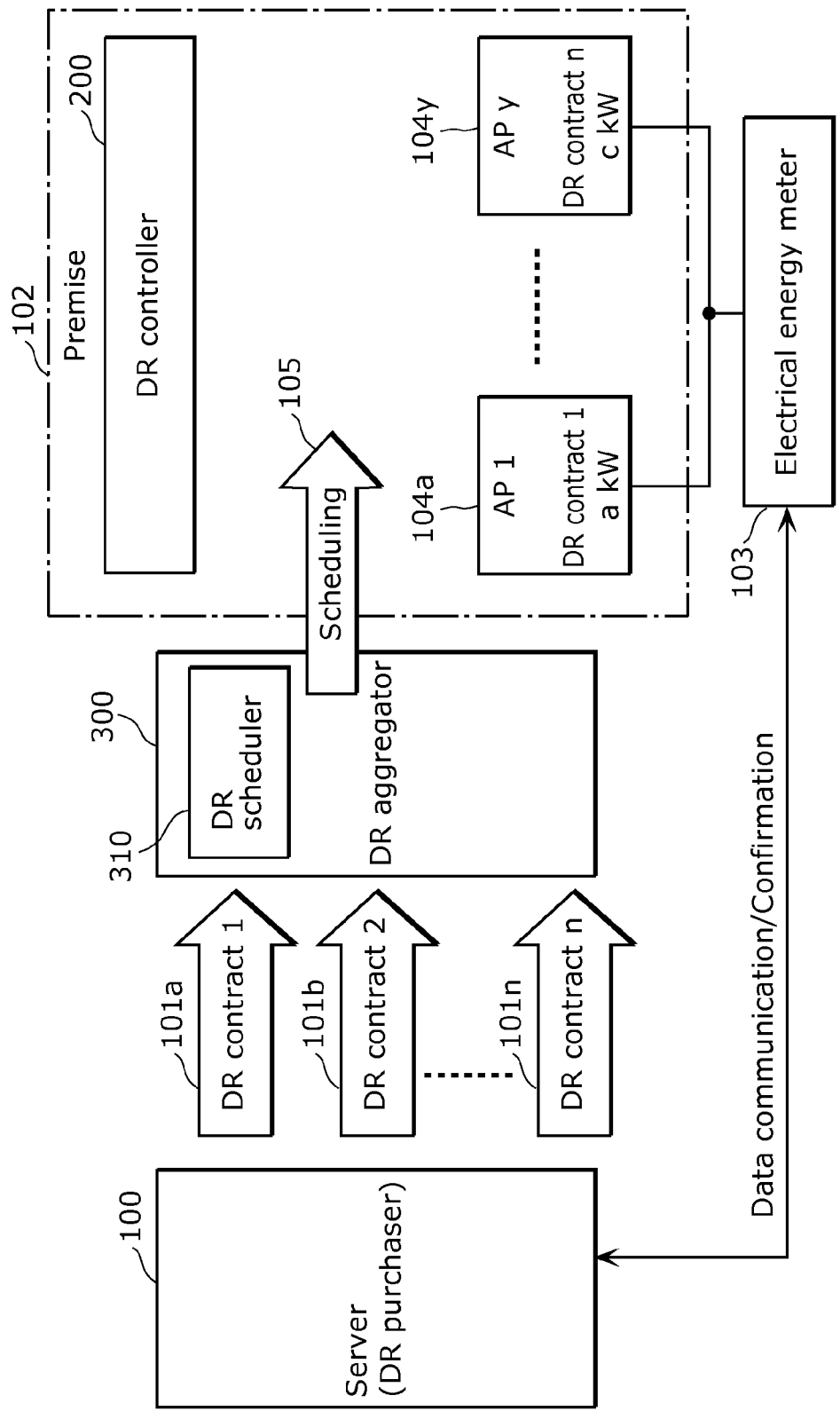
FIG. 9 is a first diagram illustrating a system configuration of a DR system according to Modification.

For example, although the demand response control apparatus according to the present invention is applied to the DR controller provided in the premise 102 according to the above-described exemplary embodiment, it can also be applied to a DR scheduler 310 of a DR aggregator 300 as illustrated in FIG. 9 according to the present invention.

In the example illustrated in FIG. 9, the DR scheduler 310 (DR aggregator 300) obtains DR contracts 101a to 101n from the server 100 of the DR purchaser, and presents, to the DR controller 200, the DR scenario selected by performing the scheduling described in the above embodiment. The DR controller 200 causes the appliances 104a to 104y to operate according to the presented DR scenario.

Figure 10:
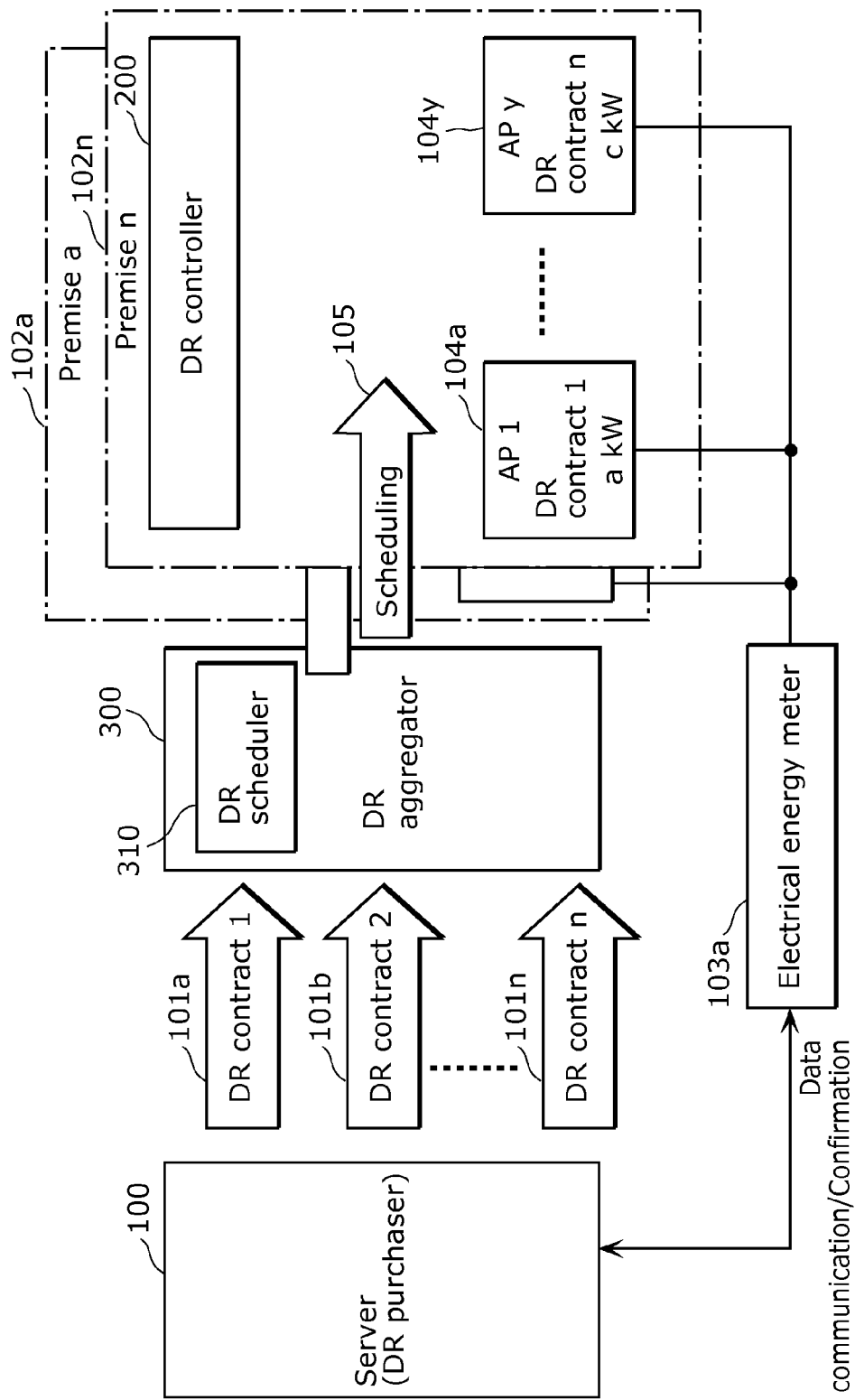
FIG. 10 is a second diagram illustrating a system configuration of the DR system according to Modification.

In addition, although the electrical energy meter 103 is provided for a single premise, the single electrical energy meter 103 may be provided to a plurality of premises 102a and 102n as shown in FIG. 10.

It is to be noted that, although a single appliance, in principle, is assigned to a singe DR contract according to the above-described exemplary embodiment, a plurality of appliances may be assigned to a single DR contract.

Each of the structural elements in the above-described exemplary embodiment may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

It should be noted that although the demand response control apparatus (demand response method) according to one ore more aspects is described based on the aforementioned exemplary embodiment, the present invention is obviously not limited to such an exemplary embodiment. Other forms in which various modifications apparent to those skilled in the art are applied to the exemplary embodiment, or forms structured by combining structural elements of different aspects of the exemplary embodiment may be included within the scope of the one or plurality of aspects, unless such changes and modifications depart from the scope of the present disclosure.

INDUSTRIAL APPLICABILITY

The present invention can be applied to a demand response system performing adjustment of supply and demand for electrical energy in an electrical energy system.

REFERENCE SIGNS LIST 100 server
101a to 101n DR type
102, 102a, 102n premise
103, 103a electrical energy meter
104a to 104y appliance
105 scheduling
150 user
200 DR controller
210 control unit
211 scenario generating unit
212 correlation analysis unit
213 verifying unit
214 welfare analysis unit
215 scheduling unit
216 operation management unit
220 storage unit
221 DR data
222 appliance data
223 provider data
224 operation data
230 communication unit
240 interface
300 DR aggregator
310 DR scheduler

The invention claimed is:

1. A demand response (DR) method for causing at least one appliance to operate based on a DR contract signed between a DR aggregator and a DR provider, the method comprising:

obtaining a plurality of the DR contracts from the DR aggregator, the plurality of DR contracts scheduled to be implemented in a target period of time, each of the DR contracts being a contract for adjusting supply and demand for energy in an electrical energy system and including a request from the DR aggregator, the request from the DR aggregator to be carried out by an operation of at least one appliance managed by the DR provider, wherein the DR aggregator is distinct from and located external to the DR provider;

determining, for each of the plurality of obtained DR contracts, whether or not content of the adjustment of the supply and demand for electrical energy requested in the DR contract is executable using the at least one appliance;

generating, based on a result of the determining, one or more DR scenarios each of which is a combination of two or more of the DR contracts executable using the at least one appliance in the target period of time;

extracting, as one or more optimization scenarios, from among the generated one or more DR scenarios, at least one DR scenario of which a total value of an amount of the adjustment of the supply and demand for electrical energy of the at least one appliance satisfies contract conditions of each of the two or more of the DR contracts included in the at least one DR scenario when the at least one appliance is caused to operate based on the at least one DR scenario; and selecting one of the extracted one or more optimization scenarios, and, based on the two or more of the DR contracts included in the selected optimization scenario, causing the at least one appliance to operate in the target period of time, wherein the total value of the amount of the adjustment of the supply and demand for electrical energy of the at least one appliance is obtained by an electrical energy meter, and wherein an incentive is to be received, from the DR aggregator, if the total value of the amount of the adjustment of the supply and demand for electrical energy of the at least one appliance obtained by the electrical energy meter complies with the contract conditions of each of the two or more of the DR contracts included in the selected optimization scenario.

2. The DR method according to claim 1, wherein the at least one appliance includes an air-conditioning device, and in the selecting, from among the extracted one or more optimization scenarios, an optimization scenario is selected of which a time period for adjusting supply and demand for electrical energy by shutting down the air-conditioning device is shorter than a predetermined time period.

3. The DR method according to claim 1, wherein in the selecting, from among the extracted one or more optimization scenarios, an optimization scenario is selected of which an incentive to be obtained is greater than or equal to a predetermined value.

4. The DR method according to claim 1, wherein the content of the adjustment of the supply and demand for electrical energy requested in the DR contract includes at least one of peak cut, frequency regulation, and reserve supply.

5. A demand response (DR) control apparatus which causes at least one appliance to operate based on a DR contract signed between a DR aggregator and a DR provider, the apparatus comprising:

an obtainer that obtains a plurality of the DR contracts from the DR aggregator, the plurality of DR contracts scheduled to be implemented in a target period of time, each of the DR contracts being a contract for adjusting supply and demand for energy in an electrical energy system and including a request from the DR aggregator, the request from the DR aggregator to be carried out by an operation of at least one appliance managed by the DR provider, wherein the DR aggregator is distinct from and located external to the DR provider;

a determiner that determines, for each of the plurality of obtained DR contracts, whether or not content of the adjustment of the supply and demand for electrical energy requested in the DR contract is executable using the at least one appliance;

a generator that generates, based on a result of the determining performed by the determiner, one or more DR scenarios each of which is a combination of two or more of the DR contracts executable using the at least one appliance in the target period of time;

an extractor that extracts, as one or more optimization scenarios, from among the generated one or more DR scenarios, at least one DR scenario of which a total value of an amount of the adjustment of the supply and demand for electrical energy of the at least one appliance satisfies contract conditions of each of the two or more of the DR contracts included in the at least one DR scenario when the at least one appliance is caused to operate based on the at least one DR scenario; and a selector that selects one of the extracted one or more optimization scenarios, and, based on the two or more of the DR contracts included in the selected optimization scenario, causes the at least one appliance to operate in the target period of time, wherein the total value of the amount of the adjustment of the supply and demand for electrical energy of the at least one appliance is obtained by an electrical energy meter, and wherein an incentive is to be received, from the DR aggregator, if the total value of the amount of the adjustment of the supply and demand for electrical energy of the at least one appliance obtained by the electrical energy meter complies with the contract conditions of each of the two or more of the DR contracts included in the selected optimization scenario.

* * * * *